United States Patent
Hoheisel et al.

(10) Patent No.: US 7,221,737 B2
(45) Date of Patent: May 22, 2007

(54) SCATTERED RADIATION GRID OR COLLIMATOR

(75) Inventors: Martin Hoheisel, Erlangen (DE); Hartmut Sklebitz, Erlangen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 11/282,372

(22) Filed: Nov. 17, 2005

(65) Prior Publication Data
US 2006/0115052 A1    Jun. 1, 2006

Related U.S. Application Data

(63) Continuation of application No. PCT/DE04/00955, filed on May 7, 2004.

(30) Foreign Application Priority Data
May 19, 2003  (DE)  ............... 103 22 531

(51) Int. Cl.
    *G21K 1/00*  (2006.01)
(52) U.S. Cl. ............ 378/154; 378/149; 250/505.1
(58) Field of Classification Search ............ 378/145, 378/147, 149, 154; 250/363.1, 505.1
See application file for complete search history.

(56) References Cited

U.S. PATENT DOCUMENTS

| | | | | |
|---|---|---|---|---|
| 3,997,794 A | * | 12/1976 | York et al. | 378/149 |
| 4,446,570 A | * | 5/1984 | Guth | 378/149 |
| 6,047,044 A | | 4/2000 | Lehmann et al. | 378/154 |
| 6,327,341 B1 | | 12/2001 | Hoheisel | 378/154 |
| 6,408,054 B1 | | 6/2002 | Rahn et al. | 378/154 |
| 2003/0072415 A1 | | 4/2003 | Eidam et al. | 378/154 |
| 2003/0089857 A1 | | 5/2003 | Hoheisel et al. | 250/370.09 |

FOREIGN PATENT DOCUMENTS

| | | |
|---|---|---|
| DE | 198 39 619 | 12/1999 |
| DE | 101 36 795 | 2/2003 |
| DE | 102 41 424 | 3/2004 |
| WO | WO 99/31674 | 6/1999 |
| WO | WO 2004/105050 | 12/2004 |

OTHER PUBLICATIONS

PCT Search Report (PCT/DE2004/000955).
Priority PCT Examination Report with English Translation (PCT/DE2004/000955).
German Office Action dated Nov. 22, 2004 with English Translation.

* cited by examiner

Primary Examiner—Edward J. Glick
Assistant Examiner—Jurie Yun
(74) Attorney, Agent, or Firm—Brinks Hofer Gilson & Lione (57) ABSTRACT

A scattered radiation grid for absorbing secondary radiation scattered by an object comprises a support, and a plurality of spaced-apart absorbing elements affixed to the support. The plurality of absorbing elements comprises relatively small tubes or pins affixed to the support via plug-in or clamping fixtures.

26 Claims, 4 Drawing Sheets

SCATTERED RADIATION GRID OR COLLIMATOR

RELATED APPLICATIONS

This application is a continuation of the Paris Convention Treaty (PCT) Application PCT/DE2004/000955 filed on May 7, 2004, designating the United States and published in German, which is hereby incorporated by reference.

FIELD

The present embodiments relate, generally, to radiation grids, and particularly, to a scattered radiation grid or a collimator that absorbs secondary radiation scattered by an object, including a support or substrate with a plurality of spaced-apart absorbing elements.

BACKGROUND

In radiology, stringent demands are made or imposed on the quality of images. For radiology images made for radiological medical diagnosis for example, X-radiation from a virtually punctate X-ray source is passed through an object to be examined, and a distribution of an attenuation of the X-radiation is detected two-dimensionally on a side of the object diametrically opposite the X-ray source. In computed tomography, line-by-line detection of the X-radiation attenuated by the object is made. Solid-state detectors are increasingly used as radiation detectors. These solid-state detectors have a matrix like array of semiconductor elements that act or operate as receivers. The X-ray image or projection achieved or made is composed of a plurality of individual pixels, and ideally, the attenuation of the radiation through the object along a straight axis or path from the X-ray source to a location on the detector surface corresponds to each of the plurality of pixels. The radiation that strikes the detector along this straight axis is referred to as a primary radiation.

However, during the passage of the X radiation through the object, interactions necessarily occur between the X-ray beams and the object, which leads to scattering effects. That is, besides the primary beams, which pass un-scattered through the object, secondary beams also occur, which strike the detector having deviated from their respective rectilinear axis or path. These secondary beams, which can make up a substantially high proportion of an entire signal modulation of the detector, are an additional source of noise and reduce a capability of detecting finely contrasting image distinctions.

For reducing the scattered radiation striking the detector, it is known to employ scattered radiation grids. Known scattered radiation grids comprise regularly arranged structures which absorb X-radiation, and between which through conduits (channels or ducts), or the like, for primary radiation are provided. A distinction is made between focused grids and unfocused grids. In focused grids, the through conduits and thus the absorption structures that determine them are aligned with the focus of the X-ray source, in contrast to unfocused grids, in which the conduits are perpendicular to the detector surface.

A mode of operation of a scattered radiation grid is such that primarily the secondary radiation, and in unfocused grids also part of the primary radiation, are absorbed via the absorbing structures, and thus do not strike the detector and do not contribute to the proportion of radiation that generates the X-ray image. On one hand, the scattered beams should be maximally absorbed, yet on the other hand, a maximal proportion of primary radiation should pass un-attenuated through the grid. Reducing the proportion of scattered radiation can be achieved via a substantially high shaft ratio of the conduits. This high ratio is between a height of the grid and a thickness or diameter of the through conduits. However, due to the thickness of the absorbing elements located between the conduits, image distortion can occur from absorption of part of the primary radiation. When the grid is used in conjunction with a matrix detector, a discontinuity in the grid causes image distortion because of the projection of the grid in the X-ray image. A potential risk is that the projection of the detector element structures and the scattered radiation grid may interfere with one another, which may lead to an occurrence of interfering moiré effects.

The above discussed grid problems or issues were also described in German Patent Application DE 102 41 424.6, which was published after the priority date of the present application. In this German patent application document, a novel type of grid is described in comparison with the conventional lead lamination grids. Conventional lead lamination grids are referred to as "placed grids." Thin lead laminations and elements, which are usually made of radio-transparent paper to form the through slits between the laminations, are placed alternatingly. However, these placed grids are limited in terms of production and manufacture and may lead to problems, such as in solid-state detectors. The grid of DE 102 41 426 is different, since being produced via a rapid prototyping technique or method using a layer-wise solidification of a buildup material. With this technique, substantially fine and exact structures can be built up, which are used for the configuration of the absorption structure. The absorption structure thus manufactured is then coated, both on the inside faces of the through conduits provided in the structure and on the diametrically opposite surfaces, with a substantially high absorbent material, and the surface coating is either reduced substantially or removed entirely in a post-treatment step or act. Although with this grid, the detectability of grid projections can be reduced and shifted into a substantially high location frequency range so that they cannot be sharply projected by the imaging systems. These grids may be expensive to manufacture, and may make stringent technical demands in terms of the course or process of manufacture. This is applicable when removing the coating from the face ends of the structure produced by stereo-lithography, which during the removal process itself may not be affected. However, a homogeneous reduction in the layer thickness or a substantially homogeneously complete removal may be necessary, so that a locally varying absorption behavior may not occur. Moreover, the coating of the insides of the through conduits needs to be or remain unaffected.

Similar problems to those in radiological diagnosis also occur in nuclear medicine, when gamma scanners or cameras are used for example. There again, care is taken such that a minimal amount of scattered gamma quanta may reach the detector. In this type of examination, the X-ray source for the gamma quanta is located in the interior of the object being examined. After an unstable nuclide has been injected, an image of an organ is generated by the detection of the quanta emitted from the body because of the decomposition of the nuclide. The course of the activity or decomposition in the organ over time allows conclusions to be drawn about a function of that organ. In this technique, as in a scattered radiation grid, a collimator is placed in front of the gamma detector and the collimator determines the projection direction of the image. In operation and construction, this collimator may be similar to the scattered radiation grid described at the outset.

SUMMARY

The present embodiments are defined by the appended claims. This summary describes some aspects of the present embodiments and should not be used to limit the claims.

A scattered radiation grid or collimator may be relatively simple to produce or manufacture.

In the provided scattered radiation grid or collimator, absorbing elements are embodied in the form of small tubes or pins and are fixed on plug-in fixtures or clamping fixtures that are provided on a support.

In one embodiment of the scattered radiation grid or collimator, a mechanical fixation of the absorbing elements on the plug-in fixtures or clamping fixtures provided on the support is achieved. That is, the absorbing elements are mounted firmly or clampingly fixed on these plug-in fixtures or clamping fixtures. The absorbing elements are embodied in the form of small tubes or as pins, and the plug-in fixtures or clamping fixtures are configured to suit the embodiment of the absorbing elements. Since the absorbing elements are prefabricated parts, which may need not be further machined and which may intrinsically have their own absorption properties, the manufacture of the scattered radiation grid or collimator can proceed markedly more simply, as the support, after the mechanical fixation of the absorbing elements, may not need to be post-machined for the sake of the absorption properties.

Various types of absorbing elements can be used. In one embodiment, all of the absorbing elements may comprise an absorbent material. The absorbing elements are shaped in the form of small metal tubes or metal pins. In an alternate embodiment, each of the absorbing elements has a support element, which comprises a radio-transparent material and is coated on at least one side face with a coating of an absorbent material. These absorbing elements accordingly comprise different materials, namely first a material of the support and second the coating material. However, since the absorbing elements are prefabricated parts, no further provisions may need to be made after the absorbing elements are placed on the support; that is, the absorbing elements are used in their prefabricated form. When the absorbing element has a tubular form or shape, a support element that is likewise in the form of a small tube and thus hollow on the inside can be coated on the inner and/or outer side face; that is, either one or two coating faces may be provided. The face ends, however, are not coated. Alternatively to the use of the tubular absorbing elements, as described pin-like absorbing elements may be used, which for a two-component structure have the support element that is coated only on its outside.

The tubular absorbing elements may be embodied with or have various cross sections. These cross sections may have hollow cylindrical, or hollow polygonal outer and/or inner shape. Numerous potential shapes are conceivable, even in mixed forms; that is, the outer shape may be cylindrical while the inner shape may be polygonal, and vice versa. Correspondingly, pin-like absorbing elements may also have cylindrical and/or polygonal cross sectional shapes.

The absorbing elements are appropriately made from elongated prefabricated wires or small tubes from which they are suitably cut to length. In absorbing elements that entirely comprise absorbent material, the long wire or small tube is a metal wire or small metal tube. While in the multi-component absorbing elements, a corresponding non-metallic wire or a corresponding small tube is provided with the absorbent coating on the inside and/or outside of the absorbing elements.

An absorbing element has a length of 1 mm to 10 mm, 2 mm to 6 mm, or 2 mm to 3 mm. This is applicable for both the small tubes and the pin-like absorbing elements. The outer diameter is between 0.3 mm to 2 mm, or between 0.5 mm to 1 mm, which likewise applies to both types of absorbing elements. For tubular absorbing elements, the wall thickness is between 20 µm to 50 µm, and for two-component elements, this figure describes the entire wall thickness comprising both the support element and the inner and/or outer coating. Other larger or smaller dimensions may be provided.

As described, the absorbing elements are mechanically fixed via the plug-in fixtures or clamping fixtures provided on the support. The plug-in fixtures or clamping fixtures may either protrude from the plane of the support or alternatively be molded into the plane of the support. In terms of the embodiment of the plug-in fixtures or clamping fixtures and the fixation of absorbing elements, different designs may be conceivable—depending on the type of absorbing element used. The tubular absorbing elements can be mounted on the plug-in fixtures or clamping fixtures that engage the interior of an absorbing element. The diameter and shape of a plug-in fixture or clamping fixture may correspond to the diameter and shape of the through conduit of an absorbing element, so that the absorbing element can be mounted or clamped onto the plug-in fixture or clamping fixture. In other words, the plug-in fixture or clamping fixture may engage the interior of the absorbing element, and the diameter or shape of the fixture is selected such that a secure mechanical hold is assured, and yet the mounting or assembling process can be effortless.

Alternatively to the placement on the fixture, tubular or pin-like absorbing elements can be received between at least two, or four, plug-in fixtures or clamping fixtures that engage the outside. That is, the absorbing elements are clamped in place between the fixtures.

In a further alternative, the fixation of the tubular or pin-like absorbing elements in plug-in fixtures or clamping fixtures are embodied as indentations or as through holes that correspond to the outer shape of the absorbing elements. That is, the absorbing elements are placed in pre-shaped recesses or holes in the support and are retained therein.

Because of the radio-transparency of the support and hence also of the plug-in fixtures or clamping fixtures integrally formed onto it, the plug-in fixtures or clamping fixtures may correspond to the length of the absorbing elements, so that the absorbing elements—in whatever way—may be received quasi-entirely on the support. Alternatively, the plug-in fixtures or clamping fixtures may be shorter than the absorbing elements, or at most half as long as the absorbing elements, which economizes on support material.

In an advantageous aspect, the plug-in fixtures or clamping fixtures may be disposed such that the absorbing elements are received while aligned with a focus of the radiation source. By suitable disposition or embodiment of the plug-in fixtures or clamping fixtures, focusing may be achieved even in this "plug-in or clamping grid or clamping collimator."

The support may be radio-transparent plastic and may be produced by stereo-lithography by the substantially rapid prototyping technique. In this regard, see DE 102 41 424.6 or related U.S. Pat. No. 6,968,041 (Publication No. 2004/0156479 Ser. No. 10/772,471)), the disclosure of which is incorporated herein by reference, already mentioned, in which the production of a support by this technique is described. In such a method, whatever previously described structure of the individual layers of a three-dimensional volumetric model of the support has been made is "inscribed" in a liquid polymer resin using a UV laser beam under computer control. By the action of the laser, the polymer resin hardens at the points or surfaces exposed to light. Once the first structure plane is "inscribed", the construction platform on which the structure is built up is sensibly lowered, after which a new resin layer is applied, and the second structure plane is "inscribed." This process is repeated until the desired structure is achieved. By using this technique, arbitrarily configured support structures can be generated. The use of a structure produced by stereo-lithography by the rapid prototyping technique has manifold advantages. First, by this technique, the support in terms of its surface structure can be produced substantially exactly and with a substantially precise shape along with the plug-in fixtures or clamping fixtures embodied there, which is practical with respect to the mechanical mounting of the absorbing elements. In another advantageous aspect, the location or disposition of the plug-in fixtures or clamping fixtures can be relatively simply varied with respect to the targeted focusing of the absorbing elements over the support plane. The plug-in fixtures or clamping fixtures themselves—since the absorbing elements are seated vertically on or in them or are parallel to them—are necessarily also focused. This "focusing" can be done substantially exactly, as described for the stereo-lithography method.

Moreover, the absorbing elements may be potted with a radio-transparent potting composition, such as an X-ray transparent plastic or a casting resin, in order to lend the structure improved stability.

The absorbing elements, and their coatings, may be of various absorption materials. For instance, W, Ta, Mo, Cu, Ni, Co, Fe, Mn, Cr, and V can be named, along with all the absorbent alloys that can be made from them, among others.

In another aspect, a method for producing a scattered radiation grid or a collimator, including a support having a plurality of spaced apart absorbing elements, is provided. In this method, via an automatic positioning mechanism, the tubular or pin-like absorbing elements are secured to plug-in fixtures or clamping fixtures provided on the support. Due to the fact that the absorbing elements are substantially thin, and given the surface area of a scattered radiation grid or collimator, which is for example 40×40 cm, up to several hundred thousand absorbing elements may be put in place, and an automatic positioning mechanism is therefore expediently used that mounts the absorbing elements on the fixtures or clamps them between them. Via the positioning mechanism, the absorbing elements can be placed individually, or secured as a plurality of absorbing elements simultaneously. After the positioning of the absorbing elements, they are embedded in a position-fixing way via a potting composition.

In the following detailed description of the drawings, illustrative and exemplary embodiments that are not to be understood as limiting are described and discussed along with their characteristics in further detail below with reference to, and in conjunction with the drawings.

DETAILED DESCRIPTION OF THE DRAWINGS

Figure 1:
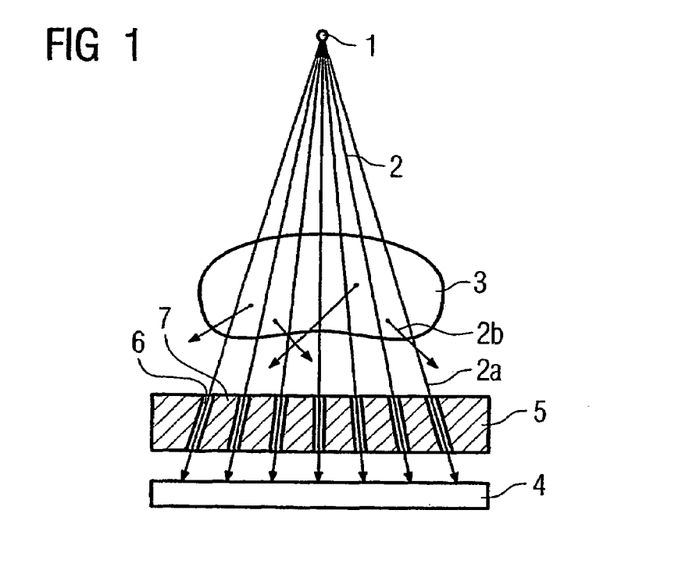
FIG. 1 schematically illustrates an operation of a scattered radiation grid in making X-radiation in one embodiment.

FIG. 1 schematically shows a mode of operation of a scattered radiation grid in radiological diagnostics. The X-ray beams 2 originating at a focus of an X-ray source 1 propagate in a straight line in the direction of an object 3. The X-ray beams pass through the object 3, and in the form of rectilinear primary radiation 2a strike a radiation detector 4 downstream of the object 3. As such, the primary radiation beams 2a produce a location-resolved distribution of attenuation for the object 3.

A portion of the radiation 2 passing through the object 3 is scattered in the object 3, thereby creating secondary radiation or scattered radiation 2b, which does not contribute to the targeted image information. When the secondary radiation or scattered radiation 2b strikes the detector, the actual image information may be adulterated and the signal-to-noise ratio may be worsened or reduced. To minimize the adverse effects of the secondary radiation 2b on the image taken at the detector, a scattered radiation grid 5 is provided, which is located between the object 3 and the detector 4. The scattered radiation grid 5 has beam channels 6, which are determined by a basic structure 7. The basic structure 7 in turn forms an absorption structure, which may absorb the striking secondary radiation 2b.

As FIG. 1 shows, the beam channels 6 are focused or in other words aligned in the direction of the X-ray source 1. Arriving primary radiation 2a, as shown in FIG. 1, points along rectilinear paths through the scattered radiation grid 5 at the detector 4; and substantially all of the other radiation, forming an angle with the paths, is absorbed or substantially attenuated by the scattered radiation grid 5.

Figure 2:
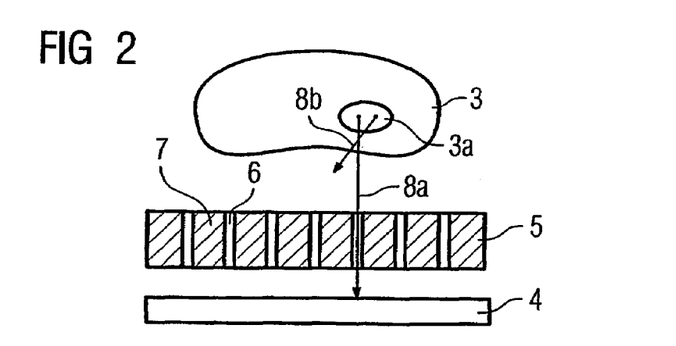
FIG. 2 schematically illustrates an embodiment of operation of a collimator in making a nuclear medicine image.

The set-up conditions are similar when making images in nuclear medicine. A radiation generating vehicle, not identified by a reference numeral in FIG. 2, that emits gamma rays is placed in an organ 3a of the object 3 being examined and is enriched therein and upon its decomposition emits gamma quanta 8a and—because of scattering in the organ 3a or object 3—also emits gamma quanta 8b as scattered radiation. Via a collimator 5, the primary radiation, in the form of the quanta 8a, reaches the detector 4 directly, while the secondary radiation at an angle with the detector, in the form of the gamma quanta 8b, is absorbed by the collimator 5.

Figure 3:
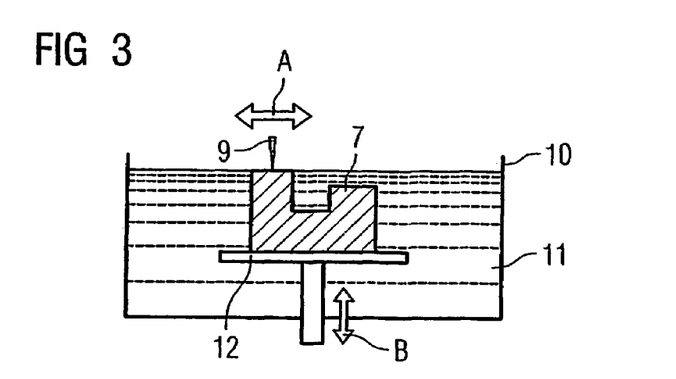
FIG. 3 schematically illustrates a stereo-lithography technique of one embodiment.

FIG. 3, schematically, shows the production of a scattered radiation grid, using a substantially rapid prototyping technique, primarily based on stereo-lithography. A laser beam 9 is aimed at a surface of a UV-cross-linkable polymer 11 located in a container 10. The laser beam 9 is moved over the surface, as indicated by the double arrow A, and the motion control, which is performed via a suitable controlling computer, is based on a three-dimensional volumetric model of the basic structure 7 to be set up or produced. Via the moving laser beam 9, the pattern of the basic structure 7 to be created is quasi-inscribed into the polymer resin 11, causing a corresponding resin layer to solidify in accordance with the inscribed pattern. This resin layer is built up on a platform 12, which once the first structural layer has been "inscribed," is lowered, as represented by the double arrow B, so that the second structural layer is inscribed. Substantially fine filigreed structures 7 can be inscribed by the laser 9 due to the good focusing ability of the laser 9, so that even substantially thin-walled structures can be made with an arbitrary configuration. The basic structure 7 can be built up either directly on the platform 12 or on a support plate, not identified by a reference numeral.

Regarding the description of the other drawing figures, it will first be pointed out that each figure describes a corresponding scattered radiation grid, while keeping similar layouts for the collimator.

Figure 4:
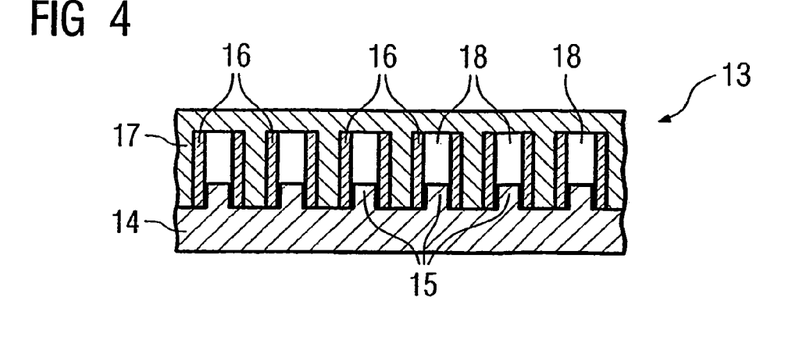
FIG. 4 schematically illustrates a cross section of a first embodiment of a scattered radiation grid or a collimator.

FIG. 4 schematically shows a cross section of an embodiment of a scattered radiation grid 13. A support 14 of radio-transparent material is plastic. This support 14 may be produced by stereo-lithography in a substantially rapid prototyping process. Near a top of the scattered radiation grid 13, a plurality of plug-in or clamping receptacles 15 distributed in a matrix-like fashion is provided, and one absorbing element 16 is mounted on each of them. The absorbing elements 16 include radio-absorbent material, such as W or Ta. The absorbing elements 16 are shaped in the form of small tubes, or in other words are hollow on the inside. The shape and diameter of the plug-in or clamping receptacles 15 corresponds to the inner shape or inner diameter of such a tubular absorbing element 16, which may be hollow with cylindrical, oval or polygonal cross sections. The absorbing elements 16 are mechanically retained on the plug-in or clamping receptacles 15 to be fixed in a stable position. Once the absorbing elements have been placed (the number of absorbing elements to be placed can amount to several hundred thousand), the entire absorption structure is potted with a potting composition 17, such as a casting resin.

Figure 5:
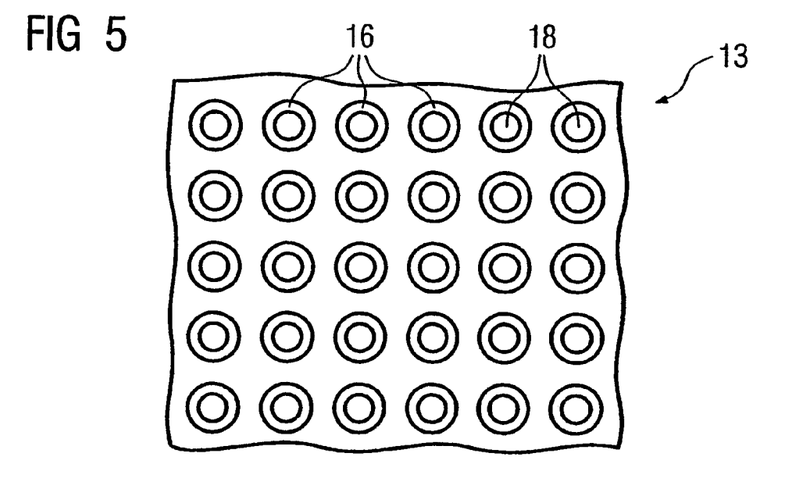
FIG. 5 is a schematic top view of the scattered radiation grid or collimator of FIG. 4.

FIG. 5 schematically shows a top view on the scattered radiation grid 13 of FIG. 4. The absorbing elements 16 can be seen arranged in rows above and below each other. They are placed substantially close together. The spacing of the plug-in fixtures or clamping fixtures 15 is selected in accordance with the wall thickness and the diameter of the absorbing elements 16. Incident X-radiation can pass through the through conduits or channels 18 formed in the absorbing elements 16, as well as through the voids located between each two absorbing elements 16.

Figure 6:
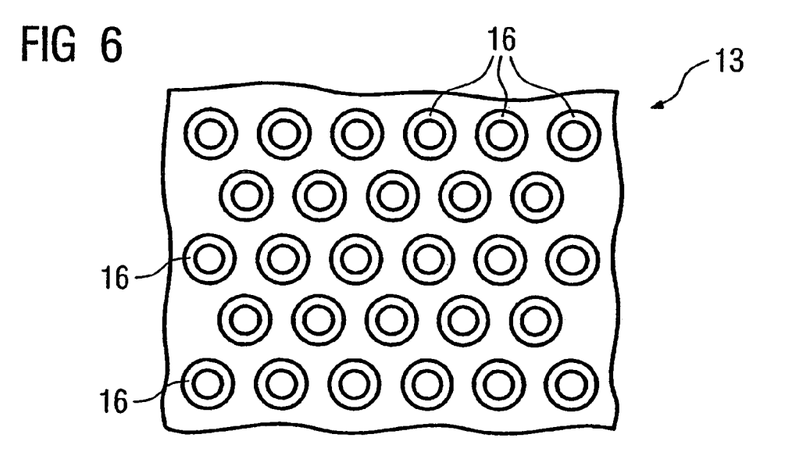
FIG. 6 is a schematic top view of the scattered radiation grid or collimator of FIG. 4, with a different geometrical arrangement of the absorbing elements.

FIG. 6 by comparison schematically shows, via a top view, a different or alternate arrangement pattern. In order to increase a packing density, the absorbing elements 16 are located in rows offset from one another. An exemplary layout, however, is similar to that described for FIG. 4.

Figure 7:
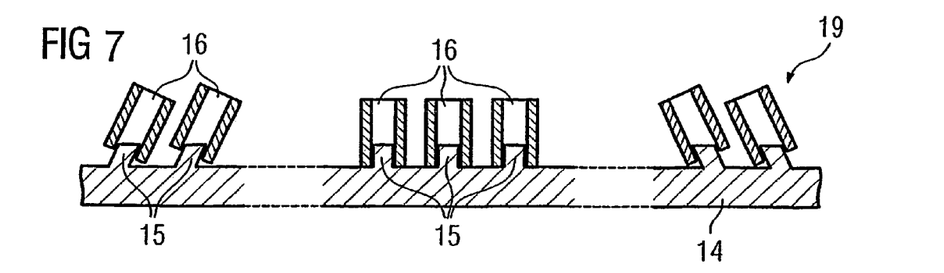
FIG. 7 schematically illustrates cross sections of a second embodiment of a scattered radiation grid or collimator.

FIG. 7 schematically shows a cross section of another embodiment of the scattered radiation grid 19, in which tubular absorbing elements 16 used. The elements 16 are mounted on plug-in or clamping receptacles 15 that project from the support surface. However, with respect to the surface area of the support 14, the plug-in or clamping receptacles 15 are each at different angles, which also enables positioning the absorbing elements 16 at a corresponding angle relative to one another. The absorbing elements 16 may be focused by aligning them with respect to a fictive focus. This fictive focus may be a radiation source that generates the primary radiation that fans out toward the scattered radiation grid 19. Because of the focusing, the primary radiation, in accordance with its alignment, that passes un-scattered through the object to be examined reaches a region of the scattered radiation grid 19 in which the absorbing elements 16 are aligned and focused in accordance with the primary radiation. This primary radiation can pass un-attenuated through the focused absorbing elements 16. However, at least some secondary radiation or scattered radiation that is scattered by the object is absorbed via the absorbing elements 16.

Figure 8:
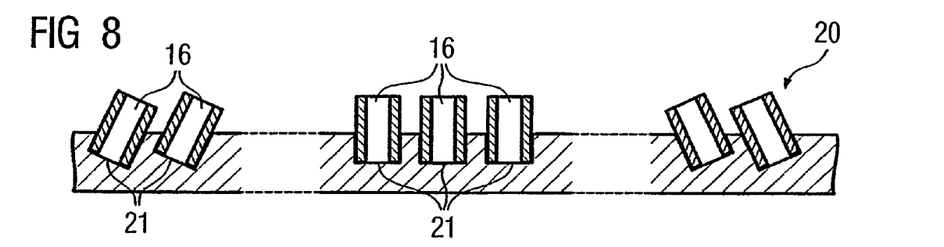
FIG. 8 schematically illustrates cross sections of a third embodiment of a scattered radiation grid or collimator.

While FIG. 7 describes the embodiment of the scattered radiation grid 19 in which plug-in or clamping receptacles 15 rise from the surface of the support 14, FIG. 8 schematically shows an alternate scattered radiation grid 20 in which the plug-in or clamping receptacles are embodied as indentations 21 that extend into the plane of the support. The indentations 21 are also embodied or positioned at an angle, so that the absorbing elements 16—in the exemplary embodiment shown as tubular absorbing elements—are aligned at an angle relative to a focus. The absorbing elements 16 are inserted into the indentations, which in their shape or diameter correspond to the outer diameter or outer shape of the absorbing elements 16, and are mechanically fixed therein.

Figure 9:
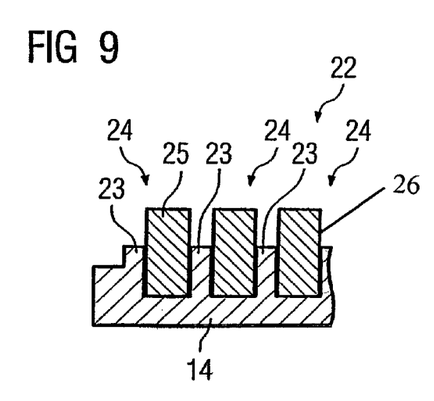
FIG. 9 schematically illustrates a cross section of a fourth embodiment of a scattered radiation grid or collimator.

FIG. 9 schematically shows a cross section of another embodiment of a scattered radiation grid 22. On the support 14, a plurality of plug-in or clamping receptacles protruding from the top surface are embodied, in the form of pegs 23, between which the absorbing elements 24 are placed and are retained in clamping fashion. This arrangement of the scattered radiation grid 22 is shown from the top view of FIG. 10. A width or shape of the pegs 23 is dimensioned such that the absorbing elements 24 can be located substantially close to each other.

Figure 10:
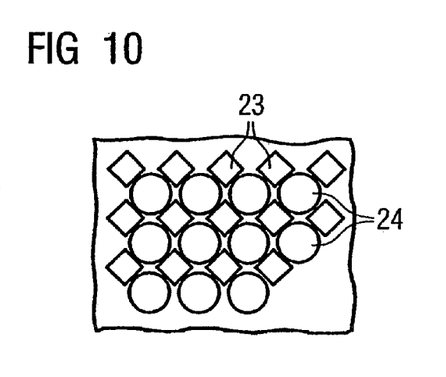
FIG. 10 is a schematic top view of the scattered radiation grid or collimator of FIG. 9.

Unlike the embodiments described above, an absorbing element 24 comprises a support element 25, made primarily of radio-transparent plastic, which forms the through conduit for the radiation. On an outside surface, the support element 25 has a coating 26 made of absorbent material. In this arrangement, the absorbing elements 24 are fixed securely via the plug-in fixtures or clamping fixtures embodied as pegs 23. The pegs 23 may also be longer than shown, optionally as long as an absorbing element.

Figure 11:
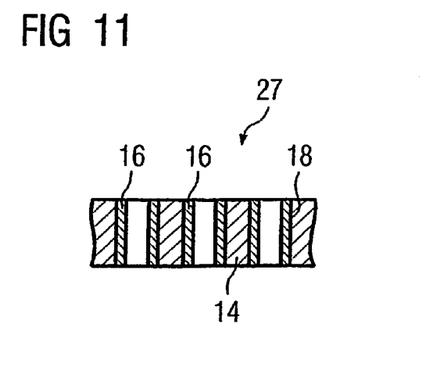
FIG. 11 schematically illustrates a cross section of a fifth embodiment of a scattered radiation grid or collimator.
Figure 12:
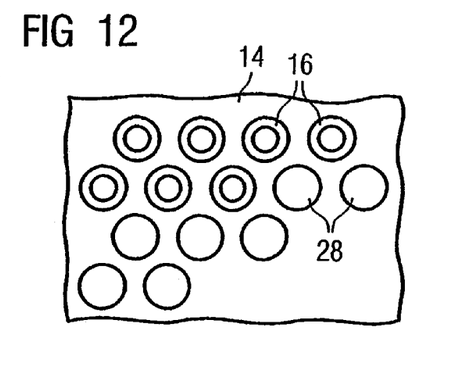
FIG. 12 is a schematic top view of the scattered radiation grid or collimator of FIG. 11.

FIG. 11 schematically shows a cross section of another embodiment of a scattered radiation grid 27. The support 14 is quasi-perforated with a plurality of holes 28 that form the plug-in or clamping receptacles. One absorbing element—shown as a tubular absorbing element 16—is inserted in clamping fashion into each hole 28. It is understood that—as in the pattern of FIG. 9—focusing of the radiation may be achieved by suitable alignment of the holes 28. A top view of the scattered radiation grid 27 is shown in FIG. 12.

Figure 13:
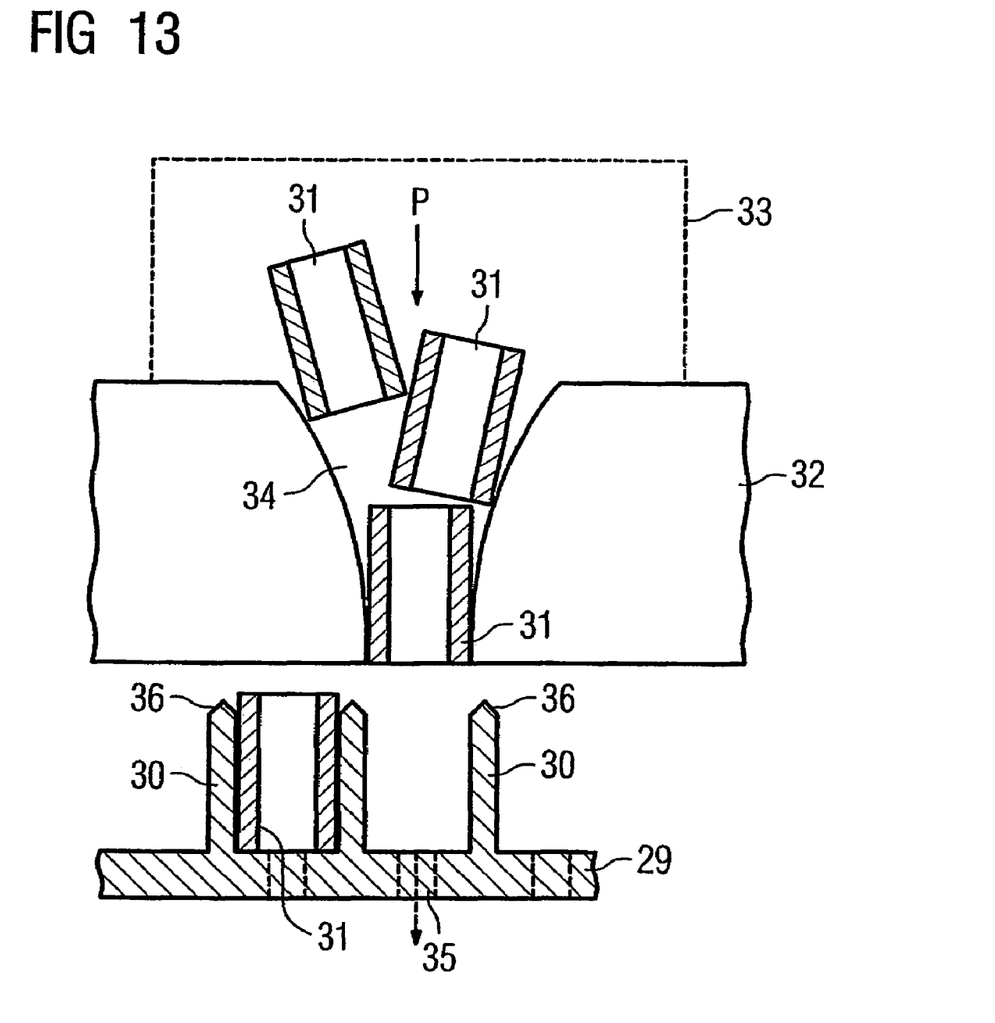
FIG. 13 schematically illustrates a process of assembly of the support.

FIG. 13 schematically shows a method for positioning the absorbing elements on the corresponding support. As an example, a support 29 is shown from which relatively long peg-like plug-in fixtures or clamping fixtures 30 protrude. One absorbing element 31—a microtubule as an example—is to be placed between a plurality of these plug-in fixtures or clamping fixtures 30. This absorbing element placement is performed via a tool 32, which is supplied with the absorbing elements 31 to be placed from a reservoir 33 that is shown as an example. These absorbing elements 31 reach a conduit 34 in the tool that is positioned substantially exactly vertically above a position between a plurality of plug-in or clamping receptacles 30 at which an absorbing element 31 is to be placed. From within this tool conduit 34, the absorbing element 31 slides into the receiving position between the plug-in or clamping receptacles 30. To improve the insertion, a slight overpressure may be applied in the tool conduit 34 via the reservoir 33, so that the absorbing element 31 is pressed in the plug-in or clamping receptacles 30. This overpressure may also be applied intermittently, whenever the tool 32 is to be positioned exactly and the absorbing element 31 is to be put in place. Alternatively or in addition, an under pressure may be applied to the support 29, via an opening 35 and may be optionally provided at each absorbing element position. This opening 35, like the arrow that symbolizes the underpressure, is shown in dashed lines. Moreover, rinsing may be performed to an absorbing element 31, for instance with a suitable liquid from the reservoir 33 or from the tool conduit 34, for example via water, with which the aforementioned pressure can be built up.

Moreover, the inner walls of the tool conduit 34 may be provided with a coating that improves sliding along the inner walls. To improve the sliding into the position toward the support, the plug-in or clamping receptacles 30 are provided with a narrowing or pointing edge 36 at their respective tops. Such edges 36 may furthermore be provided on each plug-in or clamping holder of the type described above.

Since as described, depending on the size of the scattered radiation grid, up to several hundred thousand absorbing elements are placed (in a mammography scattered radiation grid, this may be from 100,000 to 500,000 absorbing elements), it is advantageous if a plurality of absorbing elements 31 can be placed simultaneously. As such, the tool 32 may be embodied accordingly. FIG. 13 schematically shows one method. The tool 32 may be configured such that every other absorbing element receptacle can be mounted simultaneously, so that after one assembling step or act, the tool is moved onward by only a single position, and the yet unoccupied positions located in between are then filled. The tool 32 may be produced or manufactured from plastic in the course of the stereo-lithography by the substantially rapid prototyping technique, to achieve the targeted precision, even when implementing a simultaneous mounting of a plurality of absorbing elements. It should be understood that the proposed assembling method or process described is merely one example, and other types of assembly method are conceivable.

As already described, the absorbing elements, or the coatings, may be of any potential materials that absorb radiation, such as X-radiation. The length of the absorbing elements may be between 1 mm and 10 mm, or between 2 mm and 6 mm. The outer diameter—whether for a tubular absorbing element or a pin-like absorbing element—may be between 0.3 mm and 2 mm, or between 0.5 mm and 1 mm. The wall thickness of tubular absorbing elements may be between 20 $\mu$m and 50 $\mu$m. While only FIG. 4 shows the embedding of the absorbing elements in the potting composition, it is understood that all the structures shown may be embedded in a suitable potting composition.

The invention claimed is:

1. A scattered radiation grid or collimator for absorbing secondary radiation scattered by an object, the scattered radiation grid or collimator comprising:
   a support; and
   a plurality of spaced-apart absorbing elements, the plurality of absorbing elements comprising tubes or pins affixed to the support via plug-in or clamping fixtures,
   wherein the plug-in fixtures or clamping fixtures project outwardly from a plane of the support or are molded into the plane of the support, and
   wherein the tubular absorbing elements mountedly engage the plug-in fixtures or clamping fixtures via respective interiors of the tubular absorbing elements.

2. The scattered radiation grid or collimator of claim 1, wherein each of the plurality of the absorbing elements comprises an absorbent material.

3. The scattered radiation grid or collimator of claim 1, wherein each of the plurality of the absorbing elements comprises a support element, the support element comprising a radio-transparent material and being coated on at least one side face with a coating of an absorbent material.

4. The scattered radiation grid or collimator of claim 3, wherein the support element comprises a hollow tube coated on an inner and/or outer side face.

5. The scattered radiation grid or collimator of claim 3, wherein each of the tubular absorbing elements has a wall thickness of about 20 $\mu$m to about 50 $\mu$m.

6. The scattered radiation grid or collimator of claim 1, wherein the tubes have hollow cylindrical or hollow polygonal outer and/or inner cross sections.

7. The scattered radiation grid or collimator of claim 1, wherein the pins have cylindrical or polygonal cross sections.

8. The scattered radiation grid or collimator of claim 1, wherein each of the plurality of absorbing elements has a length of about 1 mm to about 10 mm.

9. The scattered radiation grid or collimator of claim 1, wherein each of the plurality of absorbing elements has a length of about of 2 mm to about 6 mm.

10. The scattered radiation grid or collimator of claim 1, wherein each of the plurality of absorbing elements has a length of about 2 mm to about 3 mm.

11. The scattered radiation grid or collimator of claim 1, wherein each of the plurality of absorbing elements has an outer diameter of about 0.3 mm to about 2 mm.

12. The scattered radiation grid or collimator of claim 1, wherein each of the plurality of absorbing elements has an outer diameter of about 0.5 mm to about 1 mm.

13. The scattered radiation grid or collimator of claim 1, wherein a length of the plug-in fixtures or clamping fixtures is equal to or shorter than a length of the absorbing elements.

14. The scattered radiation grid or collimator of claim 13, wherein the length of the plug-in fixtures or clamping fixtures is not greater than half of the length of the absorbing elements.

15. The scattered radiation grid or collimator of claim 1, wherein the plug-in fixtures or clamping fixtures are disposed such that each of the plurality of the absorbing elements is axially aligned along a rectilinear path passing through a common focus.

16. The scattered radiation grid or collimator of claim 1, wherein the support comprises a plastic material.

17. The scattered radiation grid or collimator of claim 16, wherein the support is produced via stereo-lithography implemented via a prototyping technique.

18. The scattered radiation grid or collimator of claim 1, wherein the plurality of absorbing elements is potted with a radio-transparent potting material.

19. The scattered radiation grid or collimator as defined by claim 1, wherein the absorption elements are prefabricated.

20. The scattered radiation grid or collimator as defined by claim 1, wherein the support is a single element.

21. The scattered radiation grid or collimator as defined by claim 1, wherein the absorption elements are supported by a single support.

22. A method for producing a scattered radiation grid, the method comprising:
- providing a support;
- providing plug-in fixtures or clamping fixtures that project outwardly from a plane of the support or are molded into the plane of the support;
- positioning a plurality of spaced apart absorbing elements on the support via an automatic positioning mechanism, the plurality of absorbing elements comprising tubes or pins;
- affixing securely the plurality of absorbing elements to the plug-in fixtures or clamping fixtures provided on the support via respective interiors of the absorbing elements.

23. The method as defined by claim 22, wherein the plurality of absorbing elements is securely affixed to the plug-in fixtures or clamping fixtures separately on an individual basis or simultaneously on a subset basis.

24. The method as defined by claim 22, further comprising:
- embedding the plurality of the absorbing elements in a potting material.

25. A scattered radiation grid or collimator for absorbing secondary radiation scattered by an object, the scattered radiation grid or collimator comprising:
- a support; and
- a plurality of spaced-apart absorbing elements, the plurality of absorbing elements comprising tubes or pins affixed to the support via plug-in or clamping fixtures;
- wherein the absorbing elements are affixed to the support via plug-in or clamping fixtures near only one end of the absorbing elements.

26. A scattered radiation grid or collimator for absorbing secondary radiation scattered by an object, the scattered radiation grid or collimator comprising:
- a support; and
- a plurality of spaced-apart absorbing elements, the plurality of absorbing elements comprising tubes or pins affixed to the support via plug-in or clamping fixtures;
- wherein the absorbing elements are affixed to the support via plug-in or clamping fixtures on an underside of the absorbing elements.

* * * * *